(12) United States Patent
Mitsui

(10) Patent No.: US 10,530,085 B2
(45) Date of Patent: Jan. 7, 2020

(54) TUNING FORK TERMINAL AND ELECTRICAL CONNECTION BOX

(71) Applicant: Yazaki Corporation, Tokyo (JP)

(72) Inventor: Takahiko Mitsui, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 35 days.

(21) Appl. No.: 16/140,806

(22) Filed: Sep. 25, 2018

(65) Prior Publication Data
US 2019/0103694 A1    Apr. 4, 2019

(30) Foreign Application Priority Data
Sep. 29, 2017  (JP) ................. 2017-190273

(51) Int. Cl.
| | | |
|---|---|---|
| *H01R 11/12* | (2006.01) | |
| *H01R 13/11* | (2006.01) | |
| *H02B 1/46* | (2006.01) | |
| *H02G 3/08* | (2006.01) | |
| *H01R 27/02* | (2006.01) | |
| *H01R 13/20* | (2006.01) | |
| *H01R 25/16* | (2006.01) | |
| *H01H 85/20* | (2006.01) | |
| *H02B 1/18* | (2006.01) | |

(52) U.S. Cl.
CPC ........... *H01R 13/112* (2013.01); *H01H 85/20* (2013.01); *H01R 13/113* (2013.01); *H01R 13/20* (2013.01); *H01R 25/161* (2013.01); *H01R 27/02* (2013.01); *H02B 1/46* (2013.01); *H02G 3/083* (2013.01); *H02B 1/18* (2013.01)

(58) Field of Classification Search
CPC .................................................... H01R 13/112
USPC .......................................................... 439/857
See application file for complete search history.

(56) References Cited

U.S. PATENT DOCUMENTS

| | | | | |
|---|---|---|---|---|
| 6,254,440 B1 * | 7/2001 | Ko | ......... | H01R 13/112 439/857 |
| 8,563,862 B2 * | 10/2013 | Mochizuki | ......... | H01R 4/26 174/68.2 |
| 8,840,408 B2 * | 9/2014 | Baba | ......... | H01R 12/58 439/83 |

(Continued)

FOREIGN PATENT DOCUMENTS

| | | |
|---|---|---|
| JP | 2011-82044 A | 4/2011 |
| JP | 2012-190708 * | 4/2012 |

(Continued)

*Primary Examiner* — Neil Abrams
(74) *Attorney, Agent, or Firm* — Sughrue Mion, PLLC

(57) ABSTRACT

A tuning fork terminal includes: a pair of press fit pieces having end surfaces facing each other with a gap into which a mating terminal is inserted; a connecting portion that connects one-end sides of the pair of press fit pieces; and a connection end surface that smoothly connects the one-end sides of each of the end surfaces of the pair of press fit pieces and the end surface of the gap side of the connecting portion. The connection end surface is formed by hollowing the one-end side of the end surface of the press fit piece more than the other part of the end surface, and the one-end side of each of the end surfaces of the pair of press fit pieces and the end surface of the connecting portion are smoothly connected in an arc shape to form a curved surface.

3 Claims, 4 Drawing Sheets

(56) References Cited

U.S. PATENT DOCUMENTS

| | | | |
|---|---|---|---|
| 9,022,816 B2* | 5/2015 | Endo | H01R 43/16 |
| | | | 439/857 |
| 9,336,961 B2* | 5/2016 | Kawamoto | H01H 9/02 |
| 9,831,580 B2* | 11/2017 | Mitteer | H01R 12/737 |
| 2016/0104958 A1* | 4/2016 | Hakii | H01R 13/113 |
| | | | 439/578 |
| 2018/0375312 A1 | 12/2018 | Fukuhara et al. | |

FOREIGN PATENT DOCUMENTS

| | | |
|---|---|---|
| JP | 2013-089384 A | 5/2013 |
| JP | 2015-185243 A | 10/2015 |
| WO | 2017/150567 A1 | 9/2017 |

* cited by examiner

TUNING FORK TERMINAL AND ELECTRICAL CONNECTION BOX

CROSS-REFERENCE TO RELATED APPLICATION(S)

The present application claims priority to and incorporates by reference the entire contents of Japanese Patent Application No. 2017-190273 filed in Japan on Sep. 29, 2017.

BACKGROUND OF THE INVENTION

1. Field of the Invention

The present invention relates to a tuning fork terminal and an electrical connection box.

2. Description of the Related Art

In the related art, there is known a tuning fork terminal which makes electrical contact with a mating terminal having a tab shape (so called a male tab terminal). This tuning fork terminal has a pair of press fit pieces having end surfaces arranged to face each other with a gap into which a mating terminal is inserted, a connecting portion that connects one-end sides of the pair of press fit pieces to each other, and contact portions protruding from the other end sides of each of the end surfaces of the pair of press fit pieces toward mutual facing direction to pressedly fit the mating terminal inserted into the gap. This tuning fork terminal is housed, for example, in the casing of the electrical connection box to electrically connect the electronic components and the electric wires. Such a tuning fork terminal is discussed, for example, in Japanese Patent Application Laid-open No. 2013-89384 and Japanese Patent Application Laid-open No. 2015-185243.

However, in the tuning fork terminal, the holding force for the mating terminal increases as a contact pressure (nipping force) to the mating terminal between the contact portions increases. The magnitude of the holding force is determined such that a desired electrical connection state between the tuning fork terminal and the mating terminal is obtained (that is, reliability of electrical connection between the tuning fork terminal and the mating terminal is secured). For example, the contact pressure of the tuning fork terminal can be increased by thickening a plate thickness thereby increasing stiffness. However, as the contact pressure increases, a force for widening the gap between the contact portions of the tuning fork terminal also increases. Therefore, an insertion force of the mating terminal between the contact portions or an extraction force of the mating terminal from the gap also increases, so that workability for inserting or removing the mating terminal may be degraded. In order to improve such workability, for example, it is possible to lower the insertion or removal force of the mating terminal while suppressing reduction of the contact pressure by increasing the length of the press fit piece without changing a width thereof. However, if the length of the press fit piece increases, the size of the tuning fork terminal increases disadvantageously.

SUMMARY OF THE INVENTION

In this regard, an object of the invention is to provide a tuning fork terminal and an electrical connection box, capable of securing a holding force of the mating terminal and workability for inserting or removing the mating terminal without increasing the size of the tuning fork terminal.

In order to solve the above mentioned problem and achieve the object, a tuning fork terminal according to one aspect of the present invention includes a pair of press fit pieces having end surfaces facing each other with a gap into which a mating terminal is inserted; a connecting portion that connects one-end sides of the pair of press fit pieces; contact portions protruding from the other end sides of each of the end surfaces of the pair of press fit pieces toward mutual facing direction to pressedly fit the mating terminal inserted into the gap; and a connection end surface that smoothly connects the one-end sides of each of the end surfaces of the pair of press fit pieces and an end surface of the gap side of the connecting portion, wherein the connection end surface is formed by hollowing the one-end side of the end surface of the press fit piece more than the other part of the end surface, and the one-end side of each of the end surfaces of the pair of press fit pieces and the end surface of the connecting portion are smoothly connected in an arc shape to form a curved surface.

In order to achieve the object, an electrical connection box according to another aspect of the present invention includes a casing that houses electronic components and an electric wire; and a busbar housed in the casing to electrically connect a mating terminal of the electronic component and the electric wire to each other, the busbar having a tuning fork terminal provided for each of the electronic components to receive the mating terminal inserted and electrically connected, the tuning fork terminal having a pair of press fit pieces having end surfaces facing each other with a gap into which the mating terminal is inserted, a connecting portion that connects one-end sides of the pair of press fit pieces, contact portions protruding from the other end sides of each of the end surfaces of the pair of press fit pieces toward mutual facing direction to pressedly fit the mating terminal inserted into the gap, and a connection end surface that smoothly connects the one-end sides of each of the end surfaces of the pair of press fit pieces and an end surface of the gap side of the connecting portion, wherein the connection end surface is formed by hollowing the one-end side of the end surface of the press fit piece more than the other part of the end surface, and the one-end side of each of the end surfaces of the pair of press fit pieces and the end surface of the connecting portion are smoothly connected in an arc shape to form a curved surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A tuning fork terminal and an electrical connection box according to an embodiment of the invention will now be described with reference to the accompanying drawing. Note that the invention is not limited to such embodiments.

Embodiment

A tuning fork terminal and an electrical connection box according to an embodiment of the invention will be described with reference to FIGS. 1 to 4.

Figure 1:
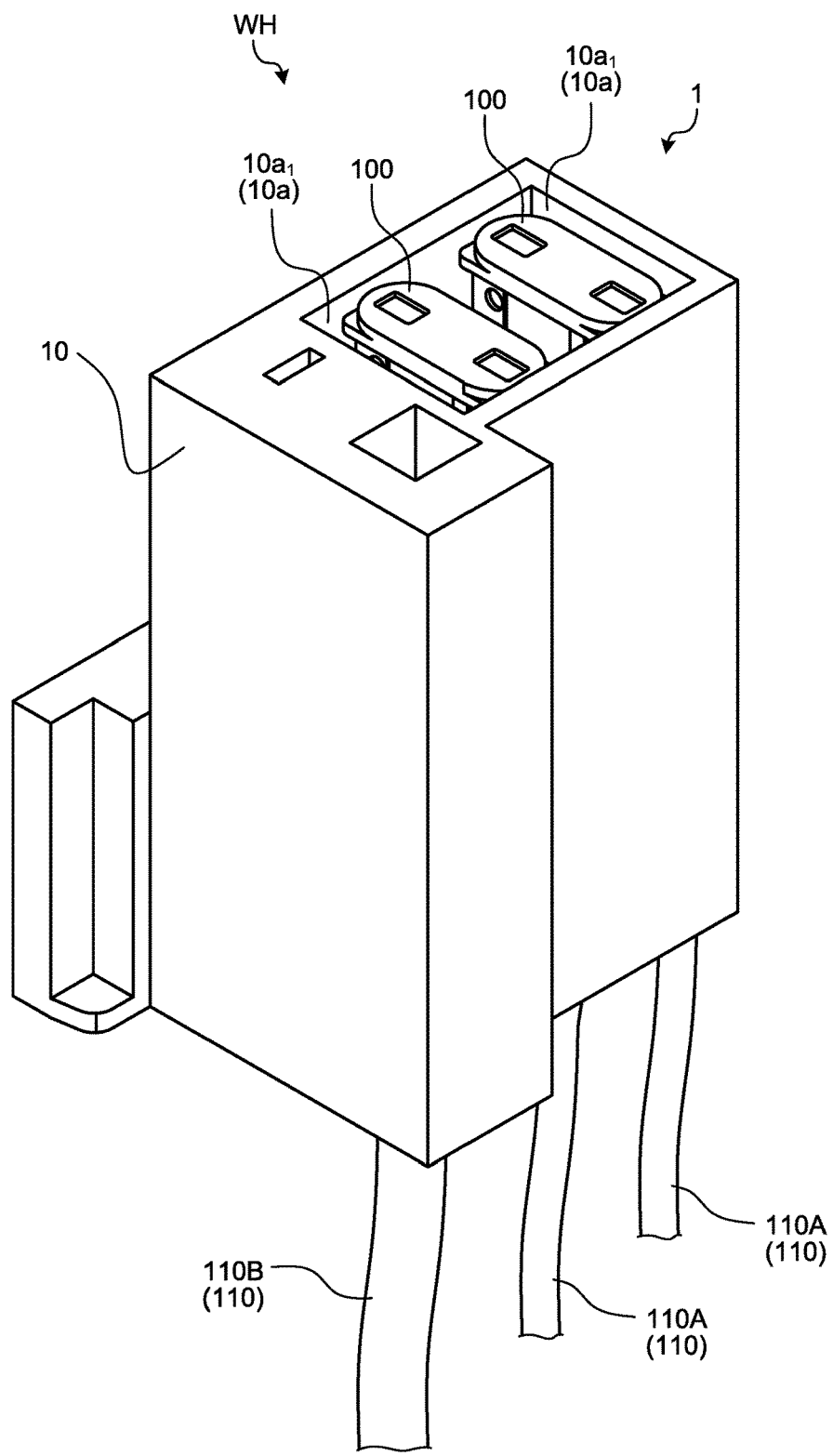
FIG. 1 is a perspective view illustrating an electrical connection box according to an embodiment of the invention.

An element 1 of FIG. 1 refers to an electrical connection box according to an embodiment of the invention. An element WH of FIG. 1 refers to a wiring harness including an electrical connection box 1 according to an embodiment of the invention.

The electrical connection box 1 according to an embodiment of the invention includes a casing 10 (FIGS. 1 and 2) that houses an electronic component 100 and an electric wire 110, a mating terminal 101 housed in the casing 10 and included in the electronic component 100, and a busbar 20 (FIG. 3) that electrically connects the electric wire 110.

Figure 2:
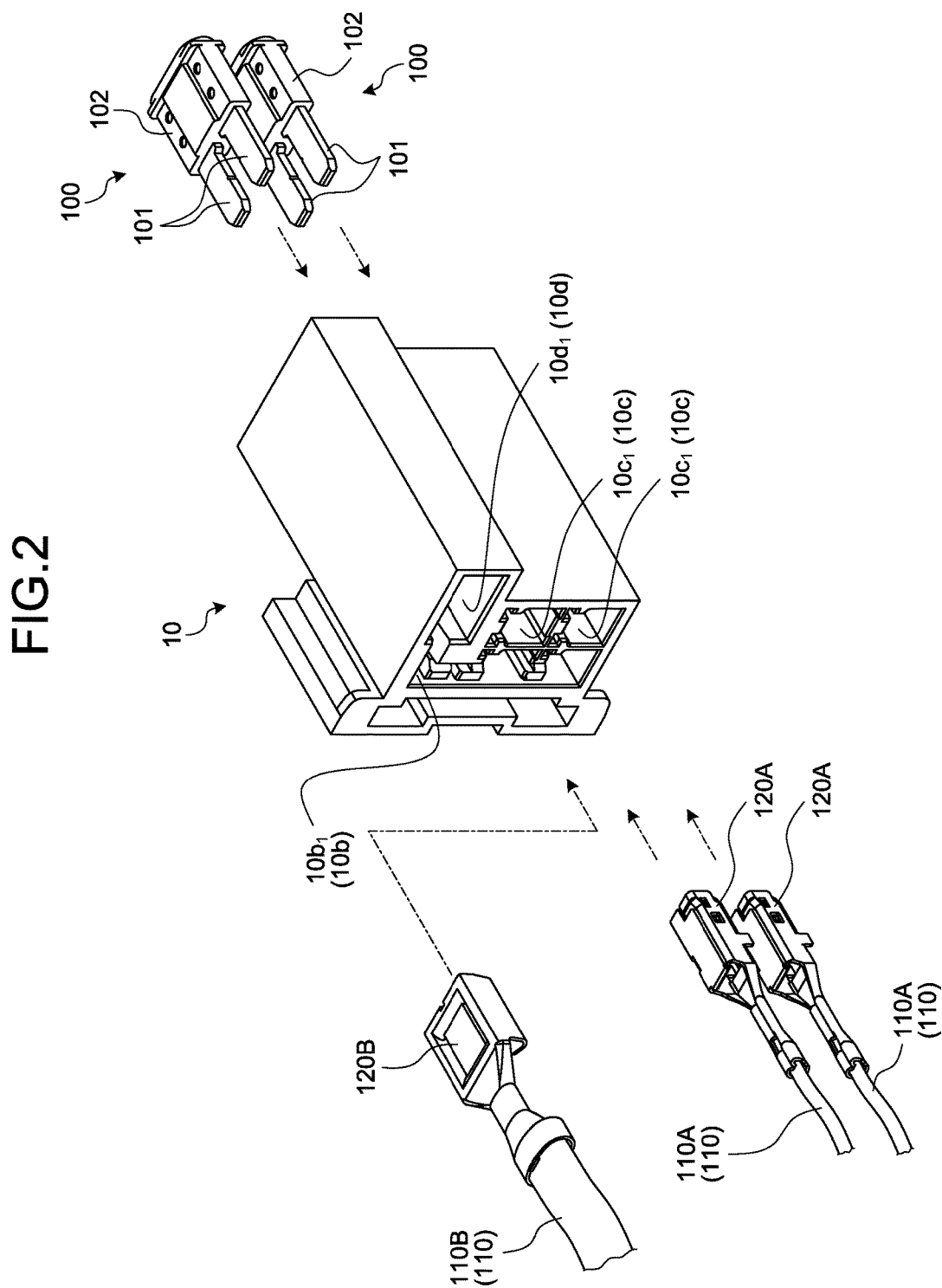
FIG. 2 is an exploded perspective view illustrating an electrical connection box according to an embodiment of the invention.
Figure 3:
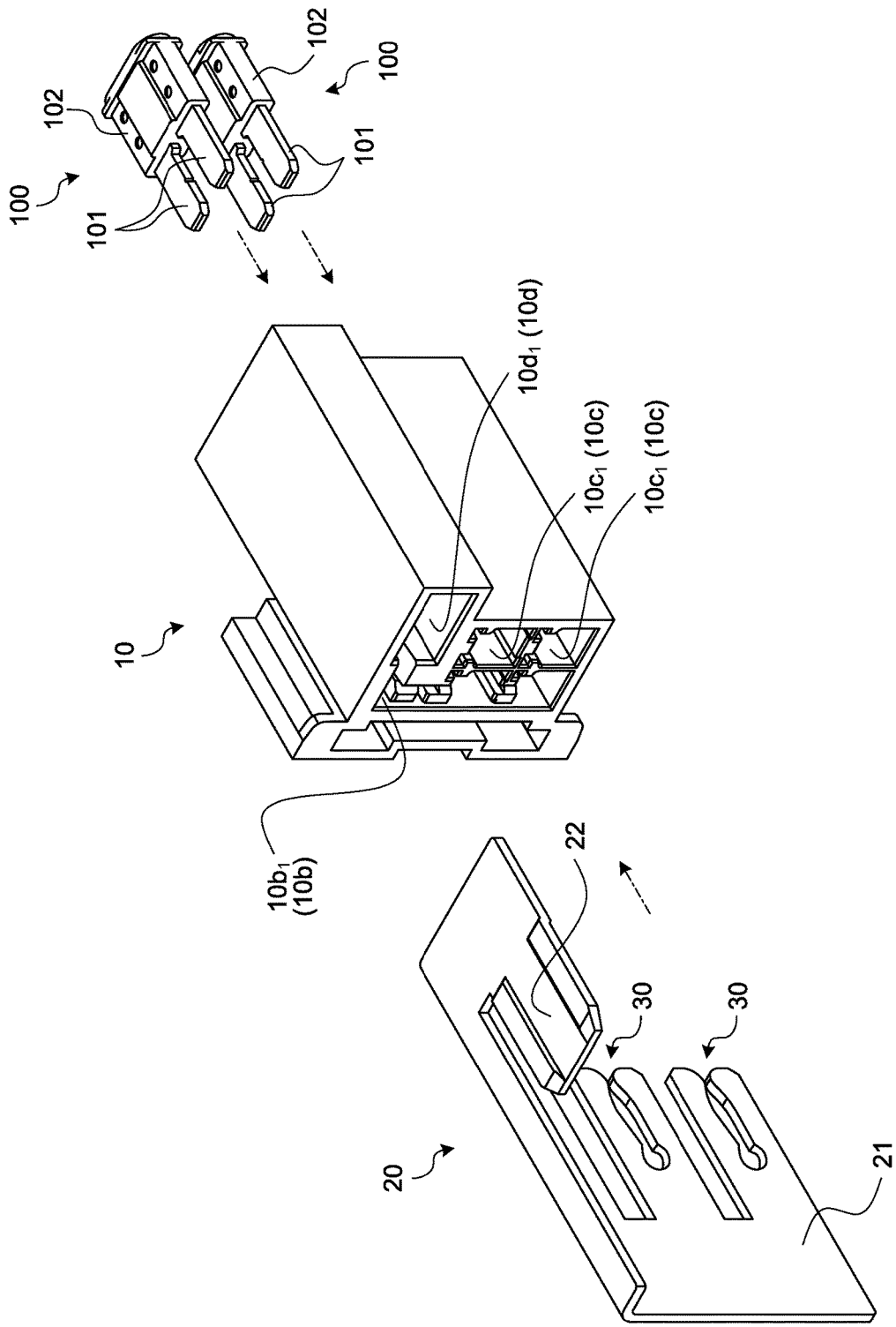
FIG. 3 is an exploded perspective view illustrating an electrical connection box according to an embodiment of the invention.

Herein, the electronic component 100 includes, for example, a circuit protection component such as a relay and a fuse and also has a plate-shaped mating terminal (so called a male tab terminal) 101. In this example, the circuit protection component having a pair of mating terminals 101 protruding from a fuse body 102 is exemplified as the electronic component 100 (FIGS. 2 and 3).

In this electrical connection box 1, the electric wire 110 inside the casing 10 is electrically connected to the electronic component 100 through the busbar 20. In addition, the electronic component 100 is electrically connected to a connection target through the electric wire 110 extracted to the outside from the inside of the casing 10. The electrical connection box 1 constitutes the wiring harness WH along with the electric wire 110.

The connection target includes a power source of a secondary battery or the like. a load of an electric device (such as an actuator), a sensor, or the like. In the electrical connection box 1, for example, a first electric wire 110A (FIGS. 1 and 2) is electrically connected to the load, and a second electric wire HOB (FIGS. 1 and 2) different from the first electric wire 110A is electrically connected to the power source. so that the power source and the load are electrically connected to each other through the electronic component 100. In this example, one of the mating terminals 101 of the electronic component 100 is electrically connected to the first electric wire 110A and is electrically connected to the load through the first electric wire 110A. The first electric wire 110A has an end portion electrically connected to a terminal blade 120A (FIG. 2) and is electrically connected to one of the mating terminals 101 through the terminal blade 120A. In this example, the other mating terminal 101 of the electronic component 100 is electrically connected to the second electric wire HOB through the busbar 20 and is electrically connected to the power source through the second electric wire HOB. The second electric wire HOB has an end portion electrically connected to a terminal blade 120B (FIG. 2) and is electrically connected to the busbar 20 through the terminal blade 120B.

The casing 10 is formed of an insulating material such as synthetic resin. The casing 10 includes a first chamber 10a (FIG. 1) provided for each electronic component 100 to house the electronic components 100, a second chamber 10b (FIGS. 2 and 3) provided for each busbar 20 to house the busbar 20, a third chamber 10c (FIGS. 2 and 3) provided for each terminal blade 120A to house the terminal blade 120A, and a fourth chamber 10d (FIGS. 2 and 3) provided to house the terminal blade 120B.

The first chamber l0a has an opening 10a1 for inserting the electronic component 100 (FIG. 1). The first chamber l0a allows the second chamber 10b and third chamber 10c to communicate with each other inside the casing 10. The other mating terminal 101 of the electronic component 100 is inserted into the second chamber 10b and is physically and electrically connected to the busbar 20 inside the second chamber 10b when the electronic component 100 is inserted into the first chamber 10a. The second chamber 10b has an opening 1Obl for inserting the busbar 20 (FIGS. 2 and 3). One of the mating terminals 101 of the electronic component 100 is inserted into the third chamber 10c and is physically and electrically connected to the terminal blade 120A inside the third chamber 10c when the electronic component 100 is housed in the first chamber 10a. The third chamber 10c has an opening 10c1 for inserting the terminal blade 120A (FIGS. 2 and 3). In addition, the fourth chamber 10d is formed by sharing one section of the second chamber 10b. The fourth chamber 10d has an opening 10d1 for inserting the terminal blade 120B (FIGS. 2 and 3). The terminal blade 120B is physically and electrically connected to the busbar 20 inside the fourth chamber 10d.

The busbar 20 is formed of a conductive material such as metal in a plate shape. The busbar 20 is press-formed by using a metal plate as a source material. The busbar 20 has a tuning fork terminal 30 provided for each electronic component 100, and the mating terminal 101 is inserted and electrically connected to the busbar 20 (FIGS. 3 and 4).

Figure 4:
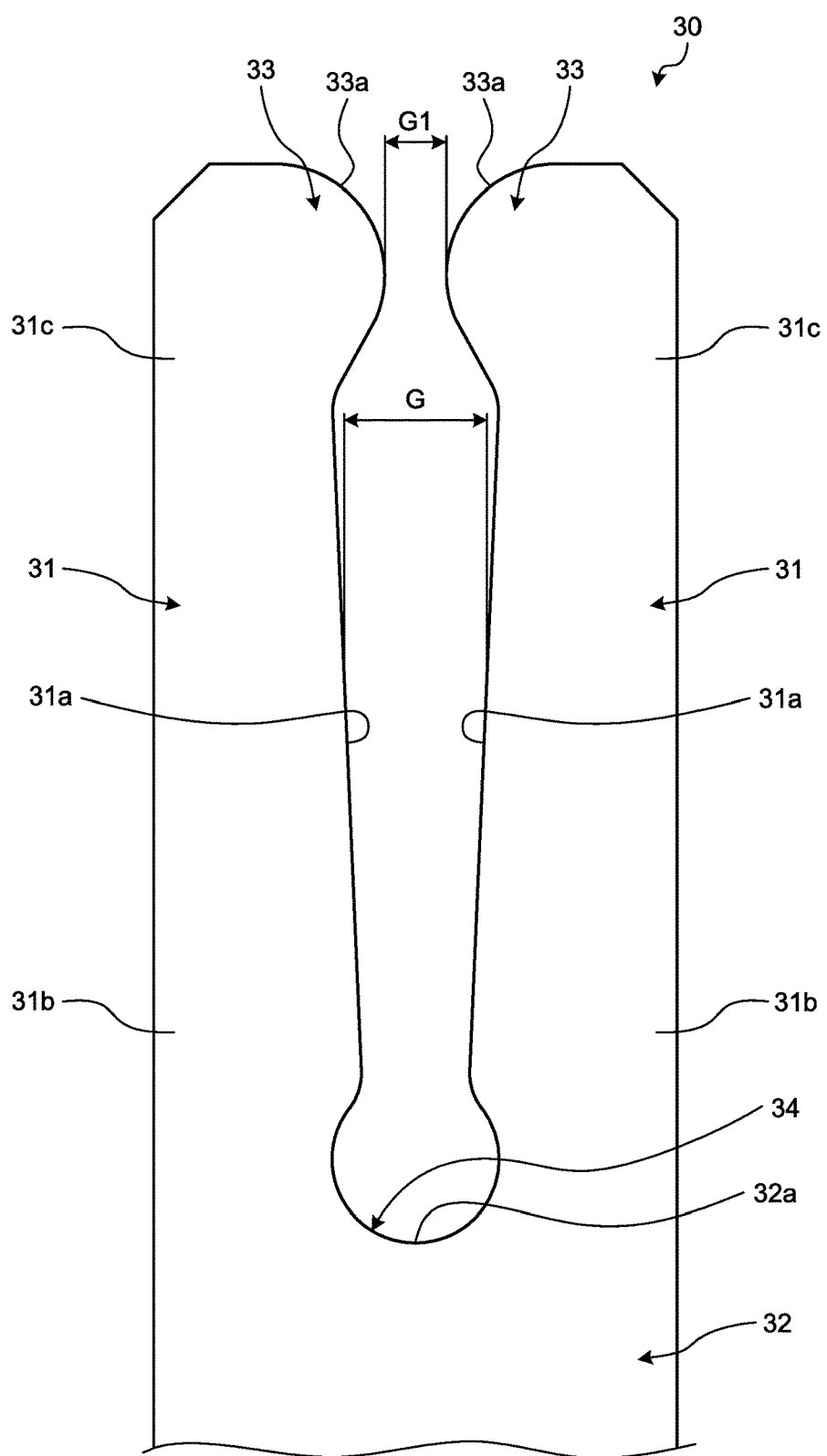
FIG. 4 is a plan view illustrating a tuning fork terminal according to an embodiment of the invention.

The tuning fork terminal 30 has end surfaces 31a facing each other with a gap and a pair of press fit pieces 31 having a gap G provided between the end surfaces 31a to receive an inserted mating terminal (one of the mating terminals 101 of the electronic component 100) (FIG. 4). A size of the gap G (interval between the end surfaces 31a) is larger than a plate thickness of one of the mating terminals 101. Each end surface 31a may be arranged in parallel with each other or may be arranged to face each other and intersect with each other along virtual extension lines. In this example, each end surface 31a is formed such that the gap G is narrowed from one end side 31c from the other end side 31b.

The tuning fork terminal 30 has a connecting portion 32 that connects the one-end sides 31b of a pair of press fit pieces 31 (FIG. 4). Each of the press fit pieces 31 extends in the same direction from the connecting portion 32.

In addition, the tuning fork terminal 30 has contact portions 33 electrically connected to one of the mating terminals 101 and provided for each press fit piece 31 (FIG. 4). Each of the contact portions 33 protrude from the other end sides 31c of each end surface 31a of a pair of press fit pieces 31 to face each other. That is, each contact portion 33 protrudes toward the gap G so as to face each other in the gap G. In this example, the contact portions 33 have end surfaces 33a swelled in an arc shape.

The tuning fork terminal 30 has a gap G1 provided between the end surfaces 33a of each the contact portion 33 (FIG. 4). This gap G1 has a size (interval between peaks of the end surfaces 33a) smaller than the plate thickness of the one of the mating terminals 101. Therefore, in this tuning fork terminal 30, the one of the mating terminals 101 inserted into the gap G is nipped between the end surfaces 33a of each contact portion 33. Therefore, it is possible to pressedly fit the contact portion 33 to the one of the mating terminals 101. Here, the gap G1 changes a contact pressure between the contact portions 33 against the one of the mating terminals 101 depending on its size. Therefore, the size of the gap G1 is determined depending on a magnitude of a desired contact pressure.

Here, the tuning fork terminal 30 has a connection end surface 34 that forms a wall of the gap G in the one-end sides 31b of the pair of press fit pieces 31 (FIG. 4). The connection end surface 34 smoothly connects the one-end side 31b of each end surface 31a of a pair of press fit pieces 31 and an end surface 32a of the gap G side of the connecting portion 32 to each other. The connection end surface 34 is formed as a curved surface that smoothly connects the one-end side 31b of each end surface 31a of a pair of press fit pieces 31 and the end surface 32a of the connecting portion 32 to each other in an arc shape by hollowing the one-end side 31b of the end surface 31a of the press fit piece 31 more than the other part of the end surface 31a. The connection end surface 34 may have a curvature changing, for example, between the press fit piece 31 side and the connecting portion 32 side or may have the same curvature. In this example, the connection end surface 34 is formed as an arc-shaped curved surface. In this tuning fork terminal 30, a boundary between the connection end surface 34 and the end surface 31a is formed in an arc shape protruding to the gap G side in order to smoothly connect its connection end surface 34 and the end surface 31a of the press fit piece 31 to each other.

Since the tuning fork terminal 30 has the connection end surface 34 hollowed more than the other part of the end surface 31a, it is possible to alleviate a stress concentration in such a position. In addition, in this tuning fork terminal 30, the one-end side 31b (that is, a root side) of the press fit piece 31 is easily bent due to the connection end surface 34. Therefore, when an external force is applied to each contact portion 33, the gap G1 is easily widened. Accordingly, in this tuning fork terminal 30, an insertion force of one of the mating terminals 101 between the contact portions 33 or an extraction force of the mating terminal 101 from the gap between the contact portions 33 is reduced, so that it is possible to improve workability for inserting or removing the one mating terminal 101. In this tuning fork terminal 30, in order to improve the insertion workability, the connection end surface 34 is hollowed more than the end surface 31a. Therefore, it is not necessary to increase the length of each press fit piece 31 in its extending direction. Accordingly, in this tuning fork terminal 30, it is possible to improve workability for inserting the one of the mating terminal 101 without increasing the size. In addition, since the tuning fork terminal 30 has the connection end surface 34, it is possible to improve workability for inserting the one of the mating terminal 101 without changing a width of each press fit piece 31 (the width in the facing direction of each press fit piece 31). That is, in the tuning fork terminal 30, if the width of each press fit piece 31 is not narrowed, it is possible to suppress degradation of stiffness of each press fit piece 31. Therefore, it is possible to suppress degradation of a holding force between the contact portions 33 for the one of the mating terminals 101. Therefore, in this tuning fork terminal 30, it is possible to suppress degradation of a holding force for the one of the mating terminals 101 and improve workability for inserting the one of the mating terminals 101. In other words, using this tuning fork terminal 30, it is possible to improve workability for inserting the one of the mating terminals 101 and continuously maintain an electrical connection state with the one of the mating terminals 101 as desired while securing the holding force.

Note that the busbar 20 has a plurality of tuning fork terminals 30 arranged in parallel, so that each tuning fork terminal 30 is connected to a single connector assembly 21 (FIG. 3). In addition, the busbar 20 has a terminal portion 22 to which the terminal blade 120B is physically and electrically connected as it is fitted (FIG. 3).

As described above, using the tuning fork terminal 30 according to this embodiment, it is possible to secure a holding force for the one of the mating terminals 101 and workability for inserting the one of the mating terminals 101 without increasing the size. In addition, in this tuning fork terminal 30, since a stress concentration is alleviated, it is possible to suppress degradation of the mechanical strength. Furthermore, since the electrical connection box 1 has the tuning fork terminal 30 according to this embodiment, it is possible to achieve the same effects of those of the tuning fork terminal 30.

The tuning fork terminal according to the embodiment invention has the connection end surface hollowed more than the end surface. Therefore, it is possible to alleviate a stress concentration in such a position. In addition, in this tuning fork terminal, due to such a connection end surface, each press fit piece is easily bent in the one-end side. Therefore, when an external force is applied to the contact portions, the gap between the contact portions is easily widened. Therefore, in this tuning fork terminal, the insertion force of the mating terminal into the gap between the contact portions or the extraction force of the mating terminal from this gap is reduced. Accordingly, it is possible to improve workability for inserting or removing the mating terminal. Since this tuning fork terminal has the connection end surface hollowed more than the end surface, it is not necessary to increase the extension length of each press fit piece in order to improve the insertion workability. Therefore, using this tuning fork terminal, it is possible to improve workability for inserting or removing the mating terminal without increasing the size of the tuning fork terminal. In addition, since this tuning fork terminal has the connection end surface, it is possible to improve workability for inserting or removing the mating terminal without changing the width of each press fit piece (without changing the width in the facing direction of the press fit piece). That is, in the tuning fork terminal, it is possible to suppress reduction of stiffness of each press fit piece if the width of each press fit piece is not reduced. Therefore, it is possible to suppress reduction of the holding force of the gap between the contact portions for the mating terminal. Accordingly, using this tuning fork terminal, it is possible to suppress reduction of the holding force for the mating terminal and improve workability for inserting or removing the mating terminal. In this manner, using the tuning fork terminal according to the invention, it is possible to the holding force for the mating terminal and workability for inserting or removing the mating terminal without increasing the size of the tuning fork terminal. Furthermore, since the electrical connection box according to the invention has the aforementioned tuning fork terminal, it is possible to achieve the same effects as those of the tuning fork terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A tuning fork terminal comprising:
a pair of press fit pieces having end surfaces facing each other with a gap into which a mating terminal is inserted;
a connecting portion that connects one-end sides of the pair of press fit pieces;
contact portions protruding from the other end sides of each of the end surfaces of the pair of press fit pieces toward mutual facing direction to pressedly fit the mating terminal inserted into the gap; and
a connection end surface that smoothly connects the one-end sides of each of the end surfaces of the pair of press fit pieces and an end surface of the gap side of the connecting portion, wherein
the connection end surface is formed by hollowing the one-end side of the end surface of the press fit piece more than the other part of the end surface, and the one-end side of each of the end surfaces of the pair of press fit pieces and the end surface of the connecting portion are smoothly connected in an arc shape to form a curved surface,
wherein the gap is gradually narrowed from the contact portions to the connection end surface,
wherein a narrowest part of the gap is located at an opening of the connection end surface to the gap, and
wherein a part of the connection end surface is wider than the narrowest part of the gap.

2. An electrical connection box comprising:
a casing that houses electronic components and an electric wire; and
a busbar housed in the casing to electrically connect a mating terminal of the electronic component and the electric wire to each other, wherein
the busbar has a tuning fork terminal provided for each of the electronic components to receive the mating terminal inserted and electrically connected,
the tuning fork terminal has a pair of press fit pieces having end surfaces facing each other with a gap into which the mating terminal is inserted,
a connecting portion that connects one-end sides of the pair of press fit pieces,
contact portions protruding from the other end sides of each of the end surfaces of the pair of press fit pieces toward mutual facing direction to pressedly fit the mating terminal inserted into the gap, and
a connection end surface that smoothly connects the one-end sides of each of the end surfaces of the pair of press fit pieces and an end surface of the gap side of the connecting portion, and
the connection end surface is formed by hollowing the one-end side of the end surface of the press fit piece more than the other part of the end surface, and the one-end side of each of the end surfaces of the pair of press fit pieces and the end surface of the connecting portion are smoothly connected in an arc shape to form a curved surface,
wherein the gap is gradually narrowed from the contact portions to the connection end surface,
wherein a narrowest part of the gap is located at an opening of the connection end surface to the gap, and
wherein a part of the connection end surface is wider than the narrowest part of the gap.

3. The tuning fork terminal according to claim 1, wherein a space between the contact portions is less than the narrowest part of the gap.

\* \* \* \* \*